June 12, 1956 G. A. ZANINOVICH 2,749,577
COLLAPSIBLE BOOTH
Filed June 7, 1952 2 Sheets-Sheet 1

GEORGE A. ZANINOVICH
INVENTOR
HUEBNER, BEEHLER,
WORREL & HERZIG
ATTORNEYS
BY

June 12, 1956  G. A. ZANINOVICH  2,749,577
COLLAPSIBLE BOOTH
Filed June 7, 1952  2 Sheets-Sheet 2
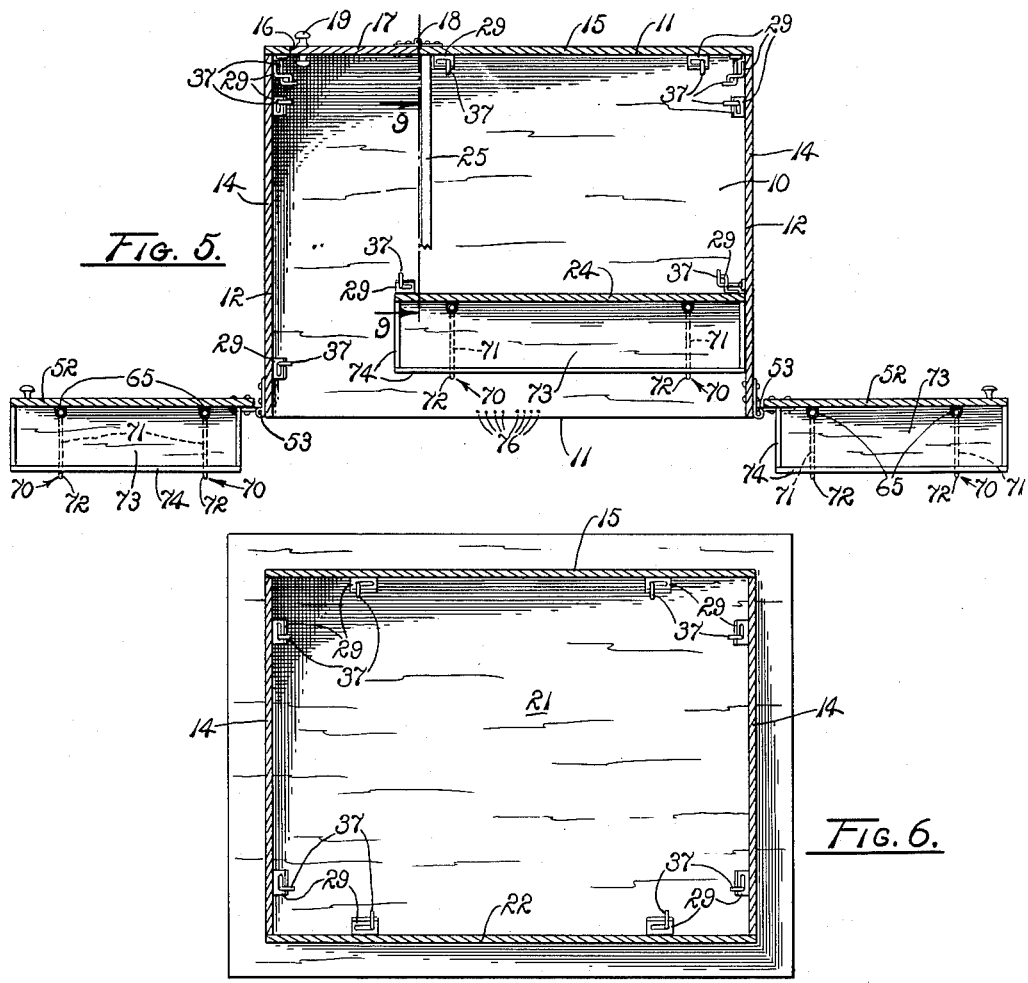
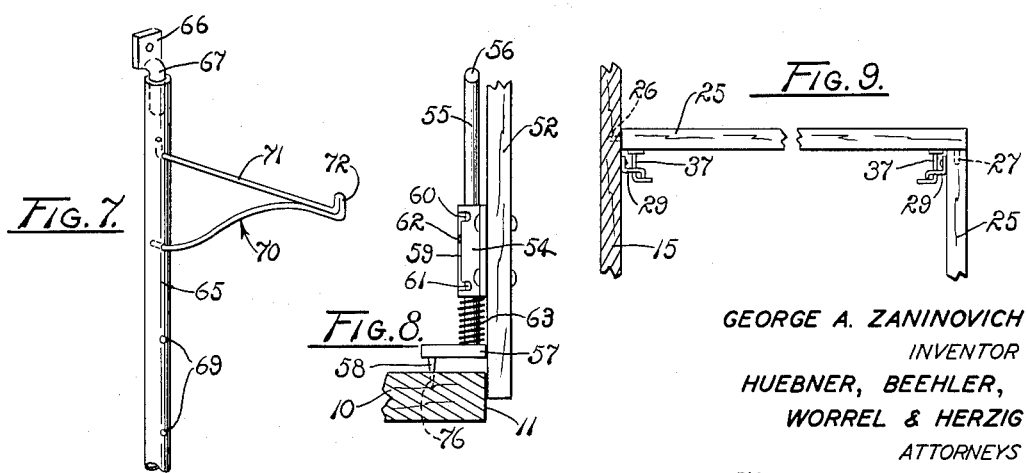
GEORGE A. ZANINOVICH
INVENTOR
HUEBNER, BEEHLER,
WORREL & HERZIG
ATTORNEYS

United States Patent Office 2,749,577
Patented June 12, 1956

2,749,577
COLLAPSIBLE BOOTH

George A. Zaninovich, Dinuba, Calif.

Application June 7, 1952, Serial No. 292,246

4 Claims. (Cl. 20—1.6)

The present invention relates to collapsible buildings and more particularly to a display or sales booth that is collapsible for portability and compact storage.

It is well known that the sale of any commodity is facilitated by making the commodity immediately available for purchase at the places and times where demand for the commodity is most active. This is particularly true of articles of food and beverages which are of universal appeal and the demand for which is dependent upon physical requirements frequently predictable by known environmental conditions, crowd accumulations, traffic patterns, and the like.

Ice cream venders, fruit peddlers, soft drink hawkers, popcorn peddlers, hot dog salesmen, and the like endeavor to take advantage of timely and/or best located offering of their wares. This is usually accomplished by carrying their articles of sale through crowds or offering the articles for sale from automotive sales trucks which are driven through residential or commercial areas of anticipated high demand or parked at strategic locations. The carrying of the articles of sale obviously limits the quantity and variety that can be made available for sale and frequently impairs the quality of perishable commodities. This is particularly true of fresh fruits and the like which are relatively heavy, exist in numerous varieties, and are easily damaged. Although automotive sales trucks can make a large variety of commodities available for sale, when driven through potential sales areas, they avail themselves of only a fraction of the demand due to their transient nature. When parked at strategic locations, they usually constitute more efficient sales media but the investment in automotive vehicles for use as stationary sales booths is not warranted.

It has been discovered that the described difficulties can be overcome by the provision of economical, speedily collapsible and reassemblable booths which may be set up at strategic locations and moved to new locations with a minimum of time and inconvenience. The broad essence of the present invention resides in the provision of such a sales booth of improved form.

Although a principal object of the present invention is to provide an improved sales booth conducive to the more effective marketing of fresh fruits, and the like, and for descriptive convenience reference is made to such marketing, it is to be understood that the invention may be utilized for general sales, display, or other use, as desired.

Another object is to provide a collapsible booth making provision for screened storage area and an exposed display area.

Another object is to provide a collapsible booth which may be speedily and easily disassembled and reassembled.

Another object is to provide a collapsible booth having elements which may be compactly assembled for storage and transporting convenience.

Another object is to provide a collapsible booth including a pair of pivotally mounted doors reciprocally positionable between closed positions and display positions with provision for supporting the doors in display positions in bracing relation to the booth.

Further objects are to provide improved elements and arrangements thereof in a device of the character and for the purposes set forth.

In the drawings:

Fig. 5 is a horizontal section taken on line 5—5 of Fig. 2.

Fig. 6 is a horizontal section taken on line 6—6 of Fig. 2.

Fig. 7 is a fragmentary perspective of the retractible means for mounting display trays on doors and an inner partition of the booth.

Fig. 8 is a fragmentary vertical section through a door and a floor element of the booth showing releasable means for holding the door in closed position.

Fig. 9 is a foreshortened fragmentary vertical section taken on line 9—9 of Fig. 5.

Figure 1:
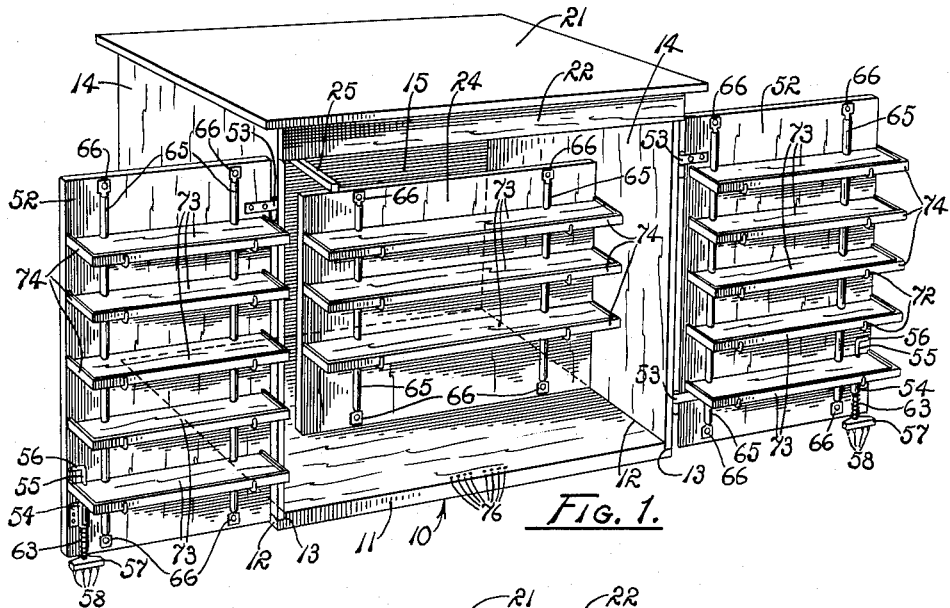
Fig. 1 is a perspective view of a booth embodying the principles of the present invention as assembled for sales and display purposes.

Referring in greater detail to the drawings:

The booth preferably utilizes a substantially rectangular floor 10 having opposite parallel side edges 11 and end edges 12. The end edges and a side edge of the floor are grooved as shown at 13 in Figs. 1 and 2. The grooved side edge is referred to as the rearward edge for descriptive convenience, and the ungrooved side edge as the forward edge, for reasons soon to become apparent.

A pair of substantially rectangular end walls 14 have lower end edges rested in the grooves of end edges 12 of the floor 10 and are upwardly extended therefrom in substantially parallel relation. A rectangular side wall 15 is fitted against a side edge 11 of the floor 10 and corresponding edges of the end walls 14. The side wall 15 defines a rearward wall for the booth and may have an opening 16 formed therein closed by a door 17 pivotally, or otherwise mounted in the opening, as by hinges 18. A latch 19 is utilized releasably to hold the door 17 in closed position.

A substantially rectangular roof 21 of a length and breadth somewhat greater than the length and breadth of floor 10 is rested on the upper edges of the end walls 14 and the side wall 15. An upper marginal front wall 22 is fitted upwardly against the roof 21 and overlays forward edges of the end walls 14 adjacent to the roof.

A partition 24 is preferably longitudinally positioned on the floor 10 and has a lower edge rested on the floor and an end edge in abutting relation to one of the end walls 14. The partition serves to define a concealed storage area rearwardly thereof and a display area forwardly thereof. For convenience in movement between the areas, the partition is of a length appreciably less than the spacing of the ends walls and of a height appreciably less than the height of the end walls so that a custodian can view the display area even when working in the storage area. An elongated brace 25 is optionally employed to brace the partition 24 in position. The brace employs a longitudinally extended stud 26 seated in a bore formed in the rear side wall 15 and a downwardly extended stud 27 seated in an upwardly disposed bore formed in the partition adjacent to the end thereof opposite to the end wall 14 which it abuts.

Figure 3:
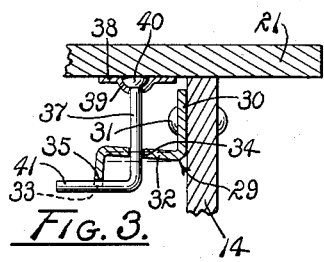
Fig. 3 is a fragmentary enlarged section of wall and roof elements of the booth showing releasable interconnection means connected therebetween.
Figure 4:
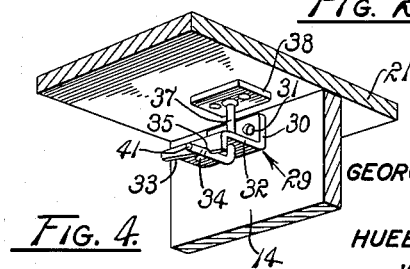
Fig. 4 is a perspective view of the structure shown in Fig. 3.

Having described the general relation of the floor 10, end walls 14, side wall 15, roof 21, marginal front wall 22, partition 24, and brace 25, attention is directed to the means for releasably interconnecting said elements in their described relation best shown in Figs. 3 and 4. The end walls 14, side wall 15, and partition 24, are releasably tensioned downwardly against the floor by the provision of a pair of spaced brackets 29 on each of the end walls and the side wall in adjacent spaced relation to the floor. Each of the brackets is substantially Z-shaped and provides a base 30 secured to the element on which the bracket is mounted by screws 31, or the like, a flat substantially rectangular ear portion 32 right-angularly extended from the base, and a camming edge 33 extended from the ear portion in substantially parallel relation to the base 30 and opposite the ear portion from the base. The ear portion provides an elongated slot 34 therethrough conveniently in parallel relation to the base. The cam edge progressively increases in width longitudinally of the ear portion and at its position of greatest width provides a notch receptacle 35. The brackets are preferably made of sheet metal or other resilient material.

A pin 37 is rotatably mounted on the floor 10 in a substantially erect position in vertical alignment with each of the slots 34 of the brackets 29 mounted on the end walls and side wall adjacent to the floor. The rotatable mounting of the pins is conveniently accomplished by means of plates 38 having downwardly disposed recesses 39 therein which are bolted or otherwise secured to the floor. The lower ends of the pins 37 are provided with enlarged fracto-spherical portions fitted to the recesses which accommodate rotational movement of the pins and a measure of swivelling thereof sufficient to accommodate alignment of the pins with the slots 34 for extension upwardly therethrough. The pins have right-angularly extended portions 41 which are short enough to pass through the slots 34 and long enough to engage the cam edge 33 when rotated.

In assembling the booth of the present invention, the end walls 14, side wall 15, and partition 24, are rested on the floor 10 and tensioned downwardly thereagainst by fitting the slots 34 of the brackets 29 downwardly over the pins 37 and rotating the angularly extended portions 41 of the pins to positions engaged with the cam edges 33 of the brackets, flexing the ear portions 32 slightly downwardly so that the extended portions rest in the receptacles 35.

As shown in Fig. 6, similar pair of brackets 29 are mounted on the end walls 14 and side wall 15 adjacent to the roof 21 and the roof provided with corresponding rotatably mounted pins 37. As previously described for the brackets 29 and pins 37, the pins are extended through slots in the brackets 43 and rotated to locked position tensioning the roof downwardly on the upper edges of the end walls and side wall.

The end walls 14, side walls 15 and 22, and the partition 24 are horizontally interconnected in the relation previously described, by similar brackets 39 and pins 37. In each instance it is to be noted that the pins are movable to locked positions resiliently flexing their respective brackets 29 and releasably interconnecting the adjacent elements on which they are mounted.

Still further, the brace 25 is releasably locked into assembled position with the studs 26 and 27 engaged in the rear wall 15 and the partition 24 by brackets 29 mounted on the rear wall and partition respectively below the brace, and pins mounted on the brace and engaged with the brackets.

Figure 2:
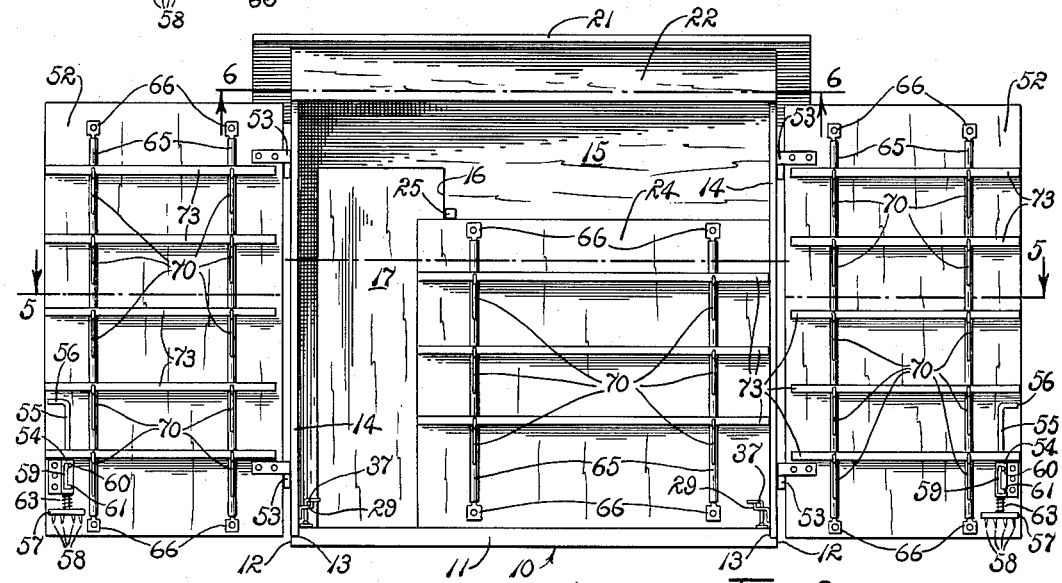
Fig. 2 is a front elevation of the booth shown in Fig. 1.

A pair of doors 52 are pivotally mounted by hinges 53 on the forward edges of the end walls 14 for movement between closed positions against the forward edge of the floor 10 in vertical alignment with the marginal front wall 22 and open display positions outwardly extended, as shown in Figs. 1, 2, and 5. The doors are of such size and shape as cooperatively to seal the front of the booth when in closed position.

In order to hold the doors selectively in open and closed positions, a vertical sleeve 54 is mounted on the outer edge of each door adjacent to the lower edge thereof, as shown in Fig. 8. A shaft 55 providing a grip 56 is rotatably and slidably mounted in each sleeve. A foot 57 having downwardly disposed spikes 58 is rigidly mounted on the lower end of each shaft. Each of the sleeves is provided with a longitudinal slot 59 having transversely extended portions 60 and 61 at the upper and lower ends thereof respectively. A boss 62 is provided on each of the shafts 55 in slidable engagement with the slot 59 and its upper and lower transverse extensions 60 and 61. A spring 63 is mounted under compression between each of the sleeves 54 and the foot 57 of its respective shaft 55 to urge the shaft and foot downwardly. It will be apparent that by rotating the shafts 55 to align their bosses 62 with their slots 59, the shafts and feet 57 may be elevationally adjustable. By rotating the shafts to draw bosses 62 into the upper or lower transverse extensions 60 or 61 of the slot, the shafts may be locked in elevated or lowered positions.

A pair of elongated support members 65 of pipe or the like are mounted in substantially erect parallel relation on the inner side of each of the doors 52 and the side of the partition 24 disposed toward the display portion of the booth. The support members are conveniently mounted for independent rotation by means of brackets 66 affixed to the doors and partitions having fingers 67 extended into the support members.

The support members 65 have a plurality of elevationally spaced bores 69 formed therein in corresponding positions. Tray-holding brackets 70 of rod or the like, are releasably mounted in pairs of bores 69 in selected elevational positions and provide substantially horizontal tray-supporting portions 71 having upwardly extended outer ends 72. Elongated trays 73 are fitted about the support member 65 and rested on the tray brackets 70. If desired, the trays provide upwardly extended walls 74 to retain fruit or other articles thereon for display. The partition 24 is preferably spaced inwardly from the outer side edge of the floor 11 a distance slightly in excess of the combined width of the trays supported on the partition and those supported on the doors so that the doors may be closed without tray interference. Although the booth may be fabricated from innumerable suitable materials, it is convenient to make the floor 10, the end walls 14, the side walls 15 and 22, the partition 24, and the doors 52 of plywood material which is generally easily worked, strong, and durable. The trays 73 may likewise be formed of plywood material.

*Operation*

The operation and utility of the booth of the present invention are believed to be clearly apparent and are briefly summarized at this point. The booth is assembled by positioning the end walls 14, side wall 15, and partition 24 in upright position on the floor 10 and tensioning said elements of the booth downwardly against the floor in the manner described by rotating the pins 37 in their respective brackets 29. The end walls are connected to both of the side walls and the partition connected to its abutted end wall similarly by means of the brackets 29 and pins 37. The roof 21 is rested on the upper edges of the end walls 14 and side walls 15 and 22 and tensioned downwardly thereagainst by means of brackets 29 and pins 37. In the same manner, the brackets 29 and pins 37 are utilized to lock the brace 25 in position.

The doors 52 are swung outwardly into the approximate positions shown in Figs. 1 and 2 and the shafts 55 released for floating movement in their sleeves 54 so that the spring 63 thrusts the feet 57 and the spikes 58 downwardly into earth engagement. The teeth preclude further pivotal movement of the doors from adjusted position and the springs exercise a lifting effect on the outer edges of the doors tending to brace the end walls 14 to which they are pivotally connected. Fruit or other articles of sale can be stored in a concealed position rearwardly of the partition 24 and displayed in an attractive manner on the trays 73. It will be apparent, that a great number of varieties and types of fruit and the like can be simultaneously displayed because of the extensive tray areas available.

To close the booth, the trays may be unloaded or permitted to remain occupied and the shafts 55 elevated in their sleeves 54 while the doors are swung to closed position against the forward side edge 11 of the floor 10. The spikes 58 are aligned with perforations 76 formed in the floor and thrust downwardly into the perforations by the spring 63 dependably holding the doors in closed position. By utilizing the door 17, a person may leave the booth subsequent to closing the doors 52 and by the provision of the latch 19, the booth may be locked.

To collapse the booth, the trays 73 are first removed from their tray brackets 70. The brackets are either removed from the support member 65 or pivoted flatly against the doors 52 and the partition 24 by rotating the support members on the fingers 67. During the disassembling, the doors 52 are preferably left in open position, as shown in Figs. 1 and 2, with the feet 57 in supporting relation to the outer edges of the doors so as to hold the end walls in erect positions. The brace 25 is released by rotating the pins 37 so that they may be lifted from the brackets 49. The pins 44 are rotated so as to be released from the brackets 43 and the roof 21 lifted from the upper edges of the end walls 14 and side walls 15 and 22.

The pins 37 are rotated to release the brackets 29 interconnecting the end walls 14 and the side walls 15 and 22 as well as the partition 24 and its end wall. The rotation of the pins 37 permits the removal of the marginal front wall 22. The pins 37 are rotated on the floor 10 to release the brackets 29 so that the partition 24 and the rearward side wall 15 can be removed while the doors 52 maintain the end walls 14 in position. Subsequently the doors 52 are pivoted backwardly against the outer surfaces of the end walls 14 and the end walls and doors removed from the floor. So disassembled, the elements of the booth can be stacked in compact relation for transporting and/or storage. The booth is so quickly and easily disassembled and reassembled that it can be conveniently moved from place to place to take advantage of the most opportune marketing conditions. The booth has been found excellently suited to the increase of the sale of fresh fruits and the like by permitting the display thereof in areas of heavy traffic and other potential customer congregation. It is economical to produce and permits the effective display of articles for sale with a minimum of investment.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A collapsible booth comprising a substantially rectangular floor, a pair of end walls having edges rested on ends of the floor and opposite edges upwardly extended therefrom, a substantially rectangular side wall having an edge rested on a side of the floor and an opposite edge upwardly extended therefrom, the end walls and the side wall being in abutting engagement, a roof rested on the upwardly extended edges of the end walls and the side wall, means releasably interconnecting the walls and the floor and tensioning the walls downwardly against the floor, resilient means releasably interconnecting the walls and the roof and resiliently tensioning the roof downwardly against the upper edges of the walls, resilient means releasably interconnecting the side wall and the end walls and resiliently tensioning the walls into abutting engagement, a substantially rectangular partition having an edge rested on the floor and a right angularly related edge in abutting engagement with an end wall, and resilient means releasably tensioning the partition downwardly against the floor and endwardly against the end wall.

2. A collapsible booth comprising a substantially rectangular floor having opposite end edges and opposite side edges in substantially right angular relation to the end edges, the end edges and a side edge of the floor having wall receiving grooves formed therein; a pair of substantially rectangular end walls having lower edges rested in the grooves at the opposite end edges of the floor, upper edges, and oppositely disposed substantially parallel erect side edges; a substantially rectangular first side wall having a lower edge rested in the groove of the side edge of the floor, an upwardly disposed edge, and oppositely substantially parallel erect side edges fitted against corresponding side edges of the end walls in overlaying relation thereto; a roof rested on the upwardly extended edges of the end walls and the side wall, a substantially rectangular marginal side wall having an upper edge fitted upwardly against the roof, a downwardly disposed lower edge, and opposite side edges fitted against the side edges of the end walls oppositely disposed from the first side wall and in overlaying relation thereto; resilient means releasably interconnecting the walls and the floor and resiliently tensioning the walls downwardly against the floor; resilient means releasably interconnecting the walls and the roof and resiliently tensioning the roof downwardly against the upper edges of the walls; resilient means releasably interconnecting the side walls and the end walls and resiliently tensioning the side walls against the side edges of the walls; a substantially rectangular partition disposed in substantially parallel relation to the side walls having an edge rested on the floor and a substantially erect edge in right angular relation thereto abutted against an end wall; and resilient means releasably interconnecting the partition and the floor and interconnecting the partition and the end wall against which it is abutted resiliently tensioning the partition downwardly against the floor and endwardly against the end wall.

3. A collapsible booth comprising a substantially rectangular floor panel, a pair of end wall panels having edges rested on ends of the floor panel and opposite edges upwardly extended therefrom, a substantially rectangular side wall panel having an edge rested on a side of the floor panel and an opposite edge upwardly extended therefrom, the end wall panels and the side wall panel being in abutting engagement, a roof panel rested on the upwardly extended edges of the end wall panels and the side wall panel, resilient means releasably interconnecting the wall panels and the floor panel and tensioning the wall panels downwardly against the floor panel, resilient means releasably interconnecting the wall panels and the roof panel and resiliently tensioning the roof panel downwardly against the upper edges of the wall panels, resilient means releasably interconnecting the side wall panel and the end wall panels and resiliently tensioning the wall panels into abutting engagement, a substantially rectangular partition panel having an edge rested on the floor panel and a right angularly related edge in abutting engagement with an end wall panel, and resilient means releasably tensioning the partition panel downwardly against the floor panel and endwardly against the end wall panel, said resilient means releasably interconnecting the wall panels and the floor panel, the wall panels and the roof panel, the side wall panel and the end wall panels, the partition panel and the floor panel, and the partition panel and the end wall panel each comprising a substantially Z-shaped bracket of resilient sheet material having a flat base secured to one of the panels which said means interconnects adjacent to its respective opposite panel interconnected thereby, an ear portion integral with the base and substantially right angularly extended therefrom in substantially parallel relation to said respective opposite panel interconnected by said means, a camming edge integral with the ear portion extended from the ear portion in substantially parallel relation to the base and away from said opposite panel, the ear portion having an elongated slot therethrough, a substantially L-shaped pin, and means swively and rotationally mounting the pin on said opposite panel for extension through the slot, the pin having a right angularly related portion engageable with the camming edge of its respective bracket when inserted through the slot and rotated to a position substantially normal to the panel on which its bracket is mounted, said right angularly related portion being spaced from the panel upon which it is mounted a distance less than the spacing of the camming edge of its bracket from said panel when the pin is disengaged therefrom whereby insertion of the pin through the slot and positioning of the right angularly related portion of the pin normal to the panel on which its bracket is mounted resiliently flexes the bracket and interconnects the associated panels under resilient tension.

4. A collapsible booth comprising a substantially rectangular floor panel having opposite end edges and opposite side edges in substantially right angular relation to the end edges, the end edges and a side edge of the floor panel having wall receiving grooves formed therein; a pair of substantially rectangular end wall panels having lower edges rested in the grooves at the opposite end edges of the floor panel, upper edges, and oppositely disposed substantially parallel erect side edges; a substantially rectangular first side wall panel having a lower edge rested in the groove of the side edge of the floor panel, an upwardly disposed edge, and oppositely substantially parallel erect side edges fitted against corresponding side edges of the end wall panels in overlaying relation thereto; a roof panel rested on the upwardly extended edges of the end wall panels and the side wall panel, a substantially rectangular marginal side wall panel having an upper edge fitted upwardly against the roof panel, a downwardly disposed lower edge, and opposite side edges fitted against the side edges of the end wall panels oppositely disposed from the first side wall panel and in overlaying relation thereto; resilient means releasably interconnecting the wall panels and the floor panel and resiliently tensioning the wall panels downwardly against the floor panel; resilient means releasably interconnecting the wall panels and the roof panel and resiliently tensioning the roof panel downwardly against the upper edges of the wall panels; resilient means releasably interconnecting the side wall panels and the end wall panels and resiliently tensioning the side wall panels against the side edges of the wall panels; a substantially rectangular partition panel disposed in substantially parallel relation to the side wall panels having an edge rested on the floor and a substantially erect edge in right angular relation thereto abutted against an end wall panel; and resilient means releasably interconnecting the partition panel and the floor panel and resiliently interconnecting the partition panel and the end wall panel against which it is abutted resiliently tensioning the partition panel downwardly against the floor panel and endwardly against the end wall panel, said resilient means interconnecting the wall panels and the floor, the wall panels and the roof panel, the side wall panel and the end wall panel, the partition panel and the floor panel, and the partition panel and the end wall panel comprising for each pair of panels interconnected thereby a pair of spaced substantially Z-shaped brackets of resilient sheet material having flat bases secured to one of the panels which said means interconnect adjacent to the opposite panel of said pair of interconnected panels, substantially rectangular ear portions individually integral with the bases and substantially right angularly extended therefrom in substantially parallel relation to said opposite panel, camming edges individually integral with the ear portions extended from their respective ear portions in substantially parallel relation to the bases and away from said opposite panel, each ear portion having an elongated slot therethrough substantially parallel to the panel on which its base is mounted, a substantially L-shaped pin individual to each bracket, and mounting means swively and rotationally mounting the pins on said opposite panel for extension through the slots of their respective brackets, the pins each having a right angularly related portion engageable with the camming edge of its respective bracket when inserted through the slot thereof and rotated to a position substantially normal to the panel on which its bracket is mounted, said right angularly related portion being spaced from the panel on which its pin is mounted a distance less than the spacing of the camming edge of its bracket therefrom when said right angularly related portion is disengaged from said camming edge whereby positioning of the right angularly related portion of the camming edge normal to the panel on which its bracket is mounted while in engagement with the camming edge resiliently flexes the bracket and interconnects the associated panels under resilient tension.

References Cited in the file of this patent

UNITED STATES PATENTS

| | | |
|---|---|---|
| 750,193 | James | Jan. 19, 1904 |
| 945,280 | Lindberg | Jan. 4, 1910 |
| 1,199,865 | Brewer | Oct. 3, 1916 |
| 1,229,118 | Miller | June 5, 1917 |
| 1,311,229 | Hughes | July 29, 1919 |
| 1,325,493 | Kenniker | Dec. 16, 1919 |
| 1,468,340 | Brown | Sept. 18, 1923 |
| 1,488,612 | Phillips | Apr. 1, 1924 |
| 1,504,699 | Miller | Aug. 12, 1924 |
| 1,527,694 | Mulcahy | Feb. 24, 1925 |
| 2,455,077 | Mastrangelo | Nov. 30, 1948 |
| 2,615,209 | Radart | Oct. 28, 1952 |